United States Patent [19]
Hollnagel

[11] 3,796,288
[45] Mar. 12, 1974

[54] ONE OR TWO WAY ENERGY (SHOCK) ABSORBER

[76] Inventor: Harold S. Hollnagel, 918 W. Laramie Ln., Milwaukee, Wis. 53217

[22] Filed: Oct. 10, 1972

[21] Appl. No.: 296,471

Related U.S. Application Data

[63] Continuation-in-part of Ser. No. 220,762, Jan. 26, 1972, abandoned, which is a continuation-in-part of Ser. No. 195,934, Nov. 5, 1971, abandoned.

[52] U.S. Cl. .................. 188/129, 188/1 B, 267/9 B
[51] Int. Cl. ............................................... F16f 7/08
[58] Field of Search............ 188/1 B, 129, 285, 319; 267/9 B, 9 C

[56] References Cited
UNITED STATES PATENTS

| | | | |
|---|---|---|---|
| 1,260,019 | 3/1918 | Oliver .......................... | 188/129 UX |
| 2,429,140 | 10/1947 | Snyder ........................ | 188/129 X |
| 3,161,908 | 12/1964 | Walach ....................... | 188/285 X |
| 2,134,666 | 12/1938 | Bogart ........................ | 188/129 X |
| 2,752,149 | 6/1956 | Forcellini .................... | 188/129 X |
| 2,819,063 | 1/1958 | Neidhart ..................... | 188/129 UX |
| 3,382,955 | 5/1968 | Deyerling .................... | 188/129 |

FOREIGN PATENTS OR APPLICATIONS

| | | | |
|---|---|---|---|
| 1,122,015 | 5/1956 | France ......................... | 188/129 |

*Primary Examiner*—Duane A. Reger
*Attorney, Agent, or Firm*—McGlynn and Milton

[57] ABSTRACT

Various embodiments of energy or shock absorbers are disclosed; however, they all have in common the inclusion of a casing with a rod movably supported in the casing for movement relative thereto. In each embodiment there is included a plurality of friction blocks which are urged into engagement with the inner walls of the casing by inclined surfaces coacting with wedge members attached to the rod. As the rod is moved relative to the casing, the wedge member disposed on the rod is moved into further wedging engagement with the friction blocks to urge the friction blocks outwardly and into engagement with the inside walls of the casing. The particular novelty generic to all of the embodiments is the feature of being able to adjust the degree to which the friction blocks are urged outwardly into engagement with the casing in the static condition. This is accomplished by effecting a relative rotation between the casing and the rod upon which the wedge members are supported. More specifically, this adjustment is accomplished by the threaded engagement between the rod and the wedge members whereby upon rotation of the rod relative to the casing, the wedge members are moved into greater or lesser wedging engagement with the friction blocks.

16 Claims, 16 Drawing Figures

PATENTED MAR 12 1974  3,796,288

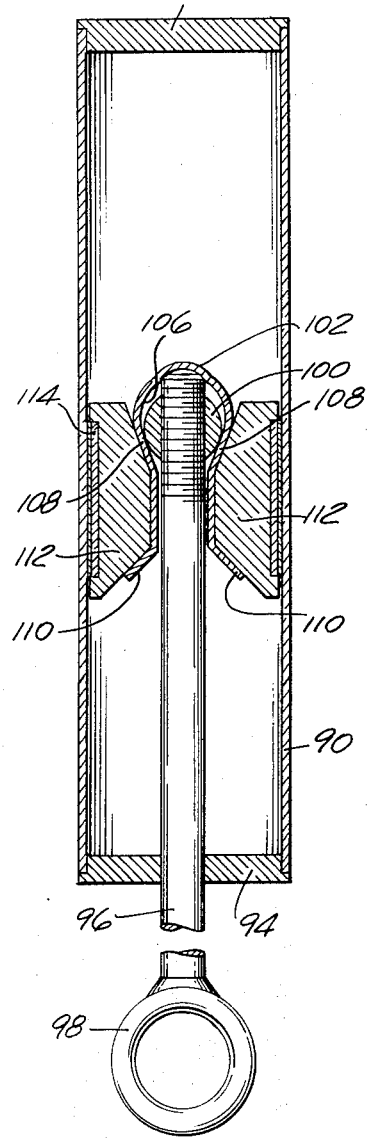
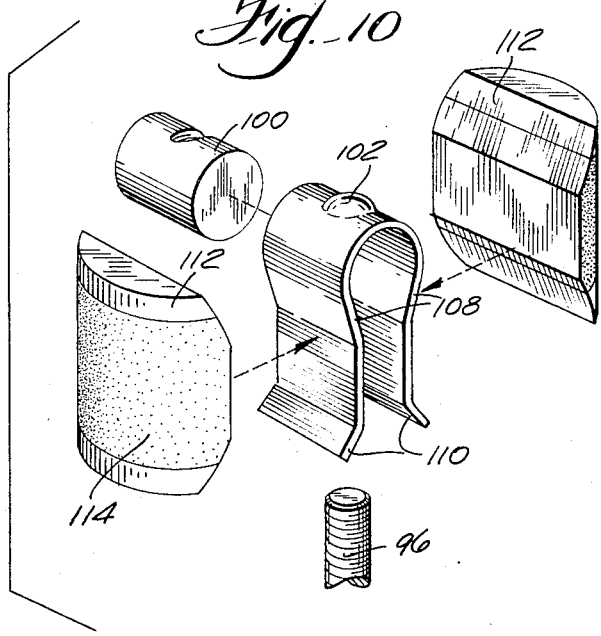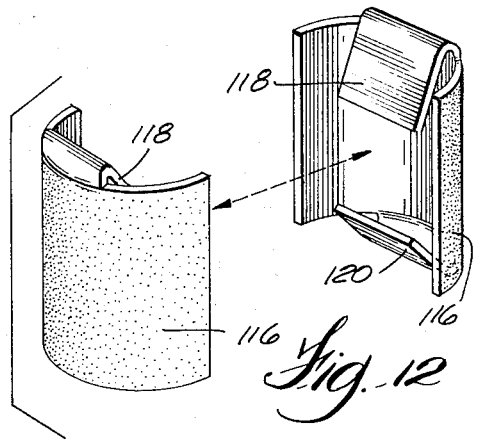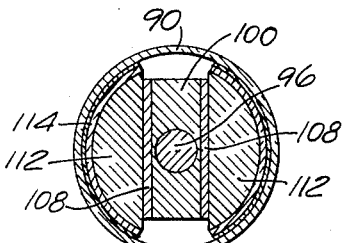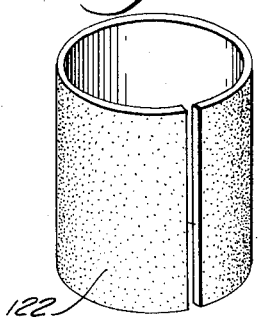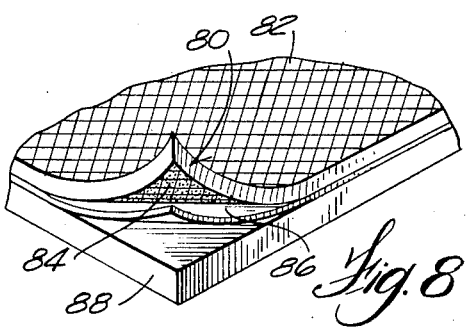

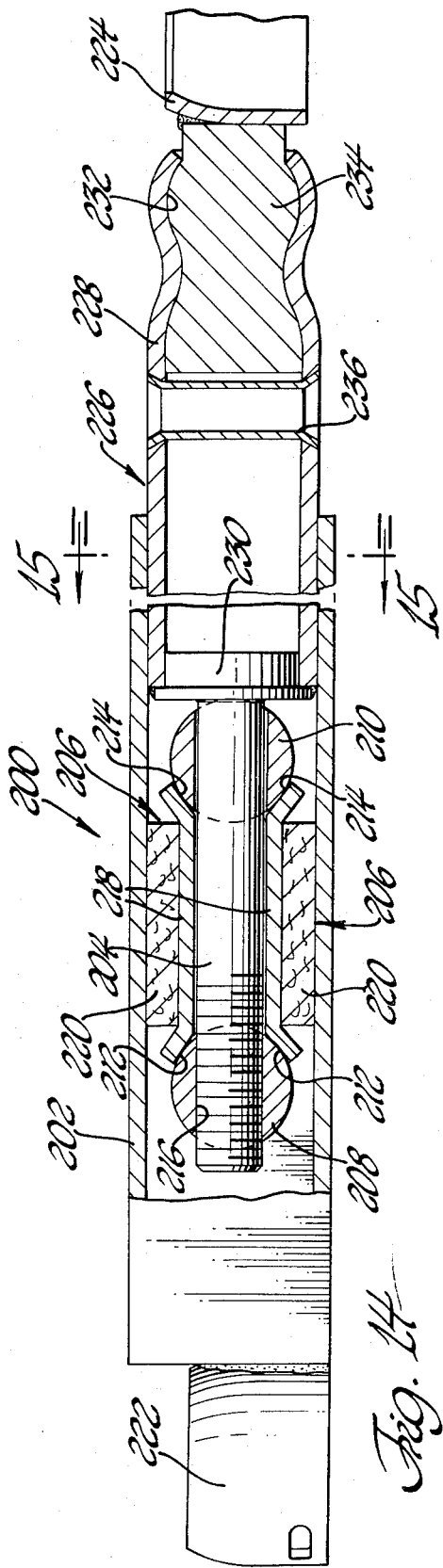
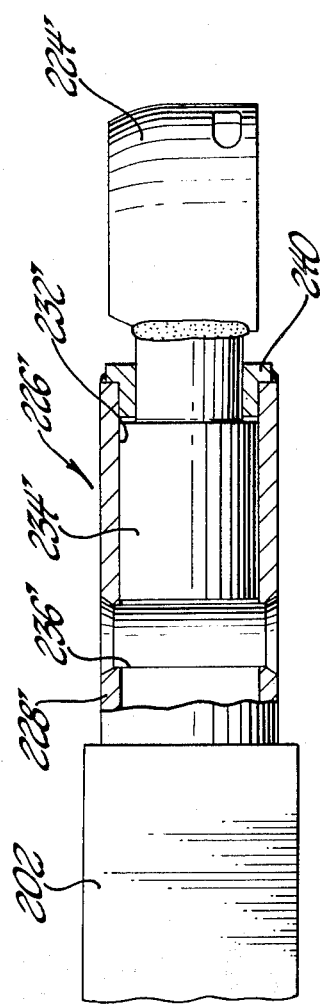
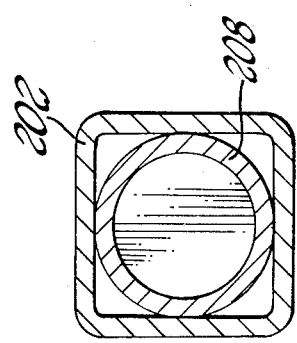

ONE OR TWO WAY ENERGY (SHOCK) ABSORBER

This application is a Continuation-in-Part of Application Ser. No. 220,762, filed Jan. 26, 1972, now abandoned, which is in turn a Continuation-in-Part of Application Ser. No. 195,934, filed Nov. 5, 1971, and now abandoned.

This invention relates to a mechanical shock absorber as distinguished from a hydraulic shock absorber. More specifically, the invention relates to a shock absorber of the type having a casing in which a rod is movably disposed and wherein there are friction blocks engaging the inner walls of the casing which are driven into frictional engagement with the casing by a wedging system interconnecting the rod and the friction blocks. Examples of prior art shock absorbers of this type are shown in U.S. Pat. Nos. 2,139,666, 2,237,318 and 2,426,661. In such shock absorbers, the greater the degree of sudden movement between the rod and the casing the greater the force to wedge the friction blocks into engagement with the casing. It is desirable in such assemblies to provide for the adjustment of the amount of frictional force with which the friction blocks engage the casing in the static condition. In the assembly shown in the above-mentioned U.S. Pat. No. 2,237,318 such adjustment can only be accomplished after disassembling the shock absorber to some degree.

Accordingly it is an object of this invention to provide an energy absorbing device including a casing with a rod movably supported in the casing and friction means disposed in frictional engagement with the casing with moving means for urging the friction means into frictional engagement with the casing and for adjusting that frictional engagement in response to relative rotation between the rod and the casing.

In correlation with the foregoing object, it is another object of this invention to provide such an energy absorbing device wherein the moving means includes a threaded connection with the rod.

In correlation with the foregoing object, it is another object of this invention to provide such an energy absorbing device wherein the moving means also includes wedge means in wedged engagement with the friction means.

In correlation with the foregoing object, it is another object of this invention to provide such an energy absorbing device wherein the threaded connection interconnects the rod and the wedge means for varying the wedged engagement upon relative rotation between the rod and casing.

Other objects and attendant advantages of the present invention will be readily appreciated as the same becomes better understood by reference to the following detailed description when considered in connection with the accompanying drawings wherein:

FIG. 8 is an illustrative view of the type of bearing material found useful in the modifications of FIGS. 9–13;

FIG. 9 is a single acting shock absorber employing a different wedge and block design;

FIG. 10 is a fragmentary exploded perspective view of the design shown in FIG. 9;

FIG. 11 is a section taken on line 11—11 in FIG. 9;

FIG. 12 shows an alternate design for the "blocks" of FIG. 9;

FIG. 13 shows a split cylinder which may be used in conjunction with the basic structure shown in FIG. 8;

FIG. 14 is a fragmentary cross sectional of yet another preferred embodiment utilizing a different wedge and block design;

FIG. 15 is a cross sectional view taken substantially along line 15—15 of FIG. 14; and FIG. 16 is a fragmentary cross sectional view showing an alternative version of the right end of the embodiment shown in FIG. 14.

Figure 1:
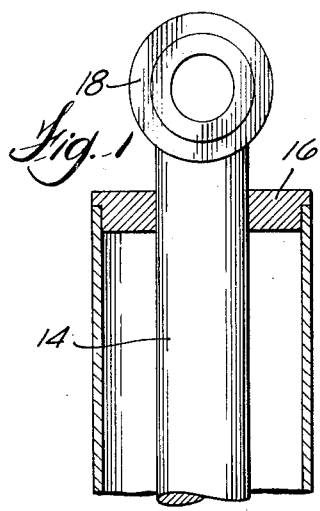
FIG. 1 shows the double acting version of the present invention.
Figure 3:
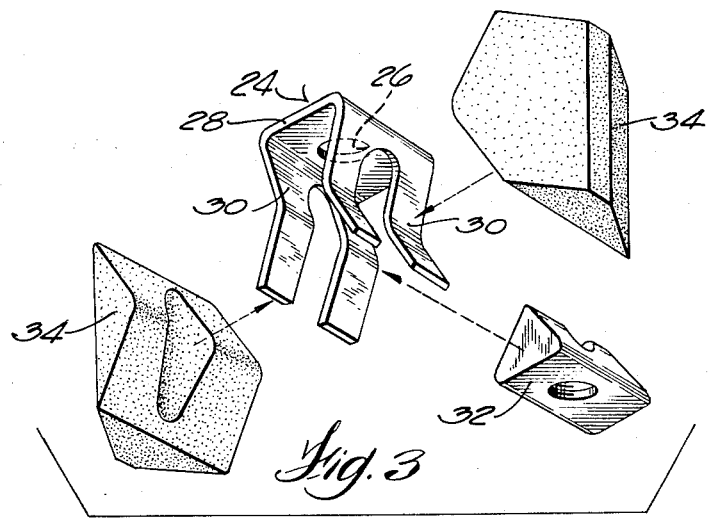
FIG. 3 is a fragmentary exploded perspective illustrating the friction blocks and the associated wedging members employed in the double acting version of FIG. 1.

The double acting modification shown in FIG. 1 employs a square tube 10 fitted at one end with a ball-type connector socket 12. The rod 14 slidably extends through the end fitting 16 and is provided with a ball-type connector socket 18 while the inner end is turned down to provide a shoulder 20 and a threaded portion 22. A resilient formed member or clip 24 has a central aperture 26 which fits over the threaded portion 22 of rod 14 and a flat portion 28 which seats against shoulder 20. The depending leg portions 30, 30 are angled inwardly to, in effect, provide a wedging surface while the lower leg portions diverge to receive wedge 32 threaded on the end of the rod. Shaped friction blocks 34, 34 are retained between the legs 30, 30 of clip 24 and the interior of the tube 10 with the blocks being shaped to generally conform to the interior surface of the tube.

Since the friction blocks 34 are captured between the resilient clip 24 and the tube, the outward bias of the legs 30, tend to hold the blocks in contact with the tube. The force pushing the block against the tube can be increased by turning rod 14 relative to tube 10 and thereby move wedge 32 along the threaded portion 22. As the wedge moves up, the blocks are forced against the interior of the tube with increasing force. Similarly, if the wedge is backed down, the forces decrease and the initial force will, therefore, be reduced. This permits complete adjustment of the resistive force exerted by this unit.

The greater the applied force the greater will be the resistance to motion. Thus this arrangement increases the damping force as the force to be damped increases. This feature coupled with the ability to adjust the initial force — the resistance to a given applied force — makes this type of damping device eminently suited to many uses.

Figure 7:
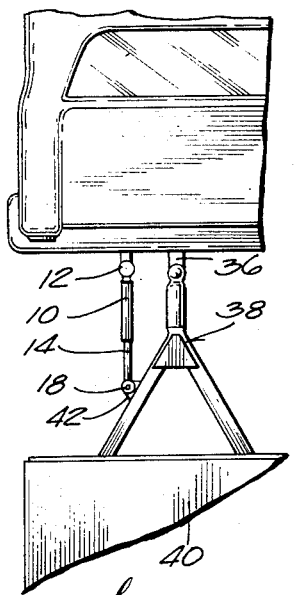
FIG. 7 is a schematicized showing from above of the manner in which the double acting unit can be utilized to control sway of a trailer when towed behind an automobile.

The unit can be mounted as shown in FIG. 7 wherein the tubular portion is connected to a separate ball spaced from the usual trailer hitch 36 to which the drawbar 38 of the trailer 40 is connected. The rod end of the damping unit is connected to an offset ball 42 and thus as the trailer tends to pivot around the trailer hitch, it is resisted by the friction force exerted by the double acting unit mounted to one side of the trailer hitch. This exerts a very substantial damping force to rapid movement (typical of a "sway") and yet permits normal operation of the trailer. This double acting unit has been employed on a test trailer which swayed dangerously at speeds in excess of 55 miles an hour but which when fitted with this unit could be trailed with no significant sway at 75 miles an hour.

The square tube of the double acting version is illustrative of the possibilities here. It has the virtue of holding the friction blocks and wedge 32 and, hence, clip 24 stable while the rod is turned relative to the tube. However, a round tube can be used as in the case of tube 44 in the single acting version shown in FIG. 4. This version is illustrated in the form it would take as a shock absorber. The tube at one end is fitted with an end piece 46 to which the mounting bracket 48 is connected by rivet 51. The bracket terminates in a connector bushing 50. The end of the tube at this end is provided with serrations 52 and the bracket has depending spring tabs 54, 54 which will drop into and grip the serrations in any position of the tube relative to the bracket. The rivet 51 is a "loose" rivet permitting the tube to be rotated relative to the bracket. The other end of the tube is provided with a centrally apertured end plate 56 through which rod 58 projects and with the free end being provided with a connector bushing 60. The other end of the rod is provided with a shoulder 62 adjacent a reduced diameter portion 64 upon which a washer 66 is mounted. The washer can be fixed or free sliding; it makes no difference. Still further down the rod there is a threaded portion 68 on which the nut 70 is threaded. As the nut draws up on the rod it tends to spread the wedge portions 72, 72 of the clip 74 which is centrally apertured (as with clip 24 in the first modification) so as to fit over the rod. This is also a resilient clip tending to push the friction blocks 76, 76 outwardly. As the rod tends to pull out of the tube, the nut 70 acting in conjunction with the wedge-like legs 72, 72 forces the blocks 76, 76 into engagement with the tube to resist the movement. However, when the rod tends to go into the tube, the blocks are free to move axially up against the washer 66 and there is no force tending to move them out against the tube. Hence, there is free motion as the rod moves into the tube and resistive motion as the rod is withdrawn from the tube.

Figure 4:
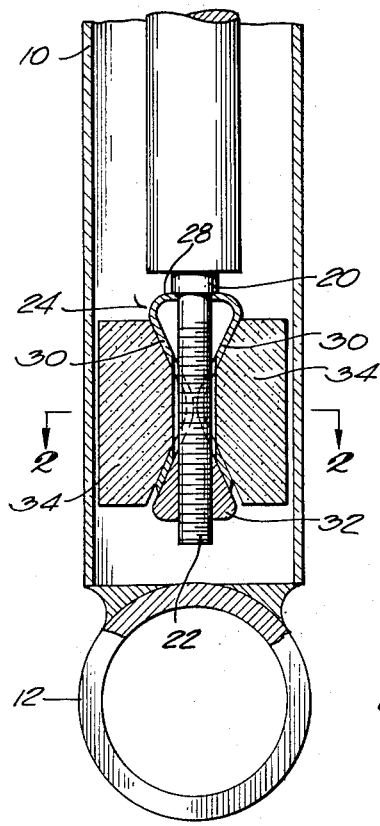
FIG. 4 shows a single acting version of the present invention.
Figure 4:
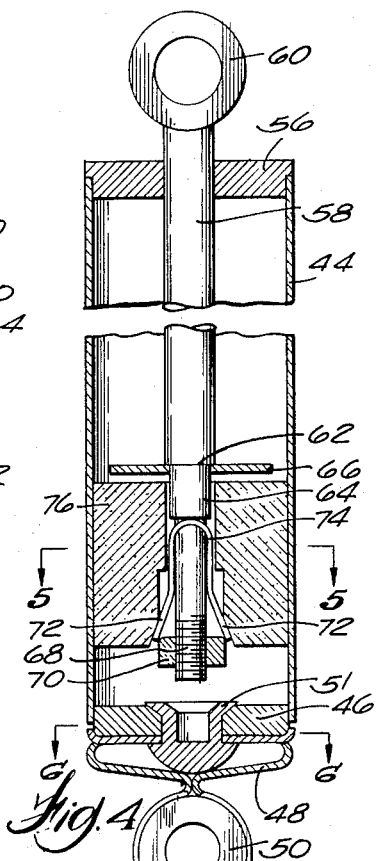
Figure 5:
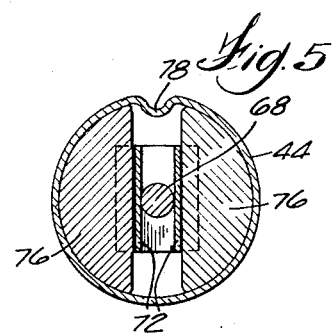
FIG. 5 is a section taken as indicated by line 5—5 on FIG. 4.

The shock absorber of FIG. 4 can be adjusted without disconnecting it from its mounts at either end. This is simply done by turning the tube which, by reason of the longitudinal crease 78 lying between the two blocks, forces the blocks to turn around the tube and carry with it the clip 74. Since the nut 70 has engagement with the clip, the nut is now forced to rotate relative to the threads 68 and move along the rod in one direction or the other. The tube will remain in the adjusted position by reason of the action of the spring tabs 54 engaging serrations 52. The longitudinal groove 78 can be omitted in some instances without loss of the ability to adjust the unit. This is due to the initial bias of the blocks into engagement with the inside of the tube being sufficient to carry the blocks with the tube as the tube is rotated.

The friction blocks described in conjunction with the foregoing are made of friction material such as used in brake lining pads. I have found, however, that woven Teflon fibers bonded to a rigid backing can also be used. The coefficient of friction is obviously less and yet the wedging action — which is adjustable — permits the resistive force to be quite adequate. FIG. 8 illustrates the way in which this material is made by the Transport Dynamics Division of Lear Siegler and sold under the trademark Fiberglide. The woven Teflon fibers have more bondable fibers interwoven to form a fiber layer 80 having, by reason of the special weaving, Teflon fibers exposed on the outside (as at 82) while the bondable fibers are on the other side of the layer (as at 84). An adhesive bonding agent 86 is used to bond the fibers to the rigid backing plate 88 — usually metal but it can be plastic in some instances. In the following description, the various layers will be ignored and the material will simply be referred to as "bearing material".

In the single acting shock absorber of FIGS. 9–11 the cylinder 90 has one end 92 closed and the other end 94 apertured to allow rod 96 to pass through. One end of rod 96 is provided with a connecting bushing or member 98 while the other end is threaded through the cylindrical "wedge" 100 to bear against the dimple 102 in the block support member 104 made of spring steel formed and bent back on itself to provide a receptacle 106 for the wedge 100. The wedge acts on surfaces 108 which lie at 20° to the axis of the rod — 20° being about the best wedging angle. The free ends 110 of the member 104 are angled at about 45°. The friction blocks 112 are received in the spaced-between surfaces 108 and 110 and have cooperating surfaces at the same angles of 20° and 45°. The outer surface of each block is grooved to receive the inserts 114 made of the bearing material. This material projects above the block surface so the bearing material is in contact with the inner wall of the cylinder 90. The blocks serve only to support the bearing material. The blocks could be cast metal or any other suitable material.

As the rod is turned into the cylindrical wedge it acts against the dimple to force the wedge against the 20° surface and effect a wedging action which is enhanced by movement of the rod away from the cylinder. Movement in the opposite sense in effect moves the blocks against the 45° surface which generates minimal wedging action against the cylinder. Thus there is a minimal resistance to movement in one direction and an adjustable, substantial resistance in the other direction. The 45° angle can be reduced to cause increased resistance in said one direction until at 20° the resistance would be the same in both directions.

The bearing material inserts 114 are preferably bonded in place. The construction shown in FIG. 12 shapes the bearing material to provide cylindrical surfaces engageable with the cylinder 90 and also provides tabs 118, 120 at 20° and 45° to seat on the member 104 and eliminate the support blocks. The cost of reduction is obvious. The split cylinder 122 of FIG. 13 can be employed in a wrap-around manner with the blocks of FIGS. 9 and 10 to eliminate bonding the bearing material to the blocks.

From the foregoing, it will be apparent that either the friction material or bearing material essentially functions as a wear surface which is highly resistive to wear. The low friction bearing material (woven Teflon) appears superior and generates appreciably less heat than the friction material. This is interesting in view of the energy dissipation function of the device — both dissipate energy but one material does it with less heat.

Since both materials function to dissipate energy by friction, the terms "friction means" or "friction surface" are used in the claims in the generic sense.

Another embodiment of an energy absorbing device constructed in accordance with the instant invention is generally shown at 200 in FIG. 14. Like the previously described embodiments the energy absorbing device 200 includes a casing 202 with a rod 204 supported in the casing 202 for movement relative thereto. The device 200 also includes friction means comprising the friction blocks 206 disposed in frictional engagement with the casing 202.

As best illustrated in FIG. 15 the casing 202 is four-sided in the form of a square when viewed in cross section.

The device 200 also includes moving means for urging the friction blocks 206 into frictional engagement with the casing 202 in response to longitudinal movement of the rod 204 relative to the casing 202 and for adjusting the frictional engagement in response to relative rotation between the rod 204 and the casing 202. This moving means includes wedge means comprising the wedge members 208 and 210 and the inclined surfaces 212 and 214 for wedging the friction blocks 206 into frictional engagement with the casing 202. This moving means also includes the threaded connection 216 between the rod 204 and the first wedge member 208. The threaded connection 216 interconnects the rod 204 and the first wedge block 208 for varying the wedged engagement between the friction blocks 206 and the casing 202 upon relative rotation between the rod 204 and the casing 202. In other words and as will become more clear hereinafter, as the rod 204 is rotated relative to the casing 202 to move the first wedge member 208 toward the second wedge member 210, the wedge members coact with the inclined surfaces 212 and 214 to move the friction block outwardly into more frictional engagement with the opposite sides of the casing 202.

Figure 2:
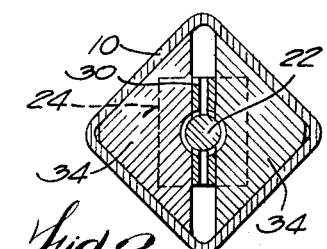
FIG. 2 is a section taken as indicated by line 2—2 of FIG. 1.
Figure 6:
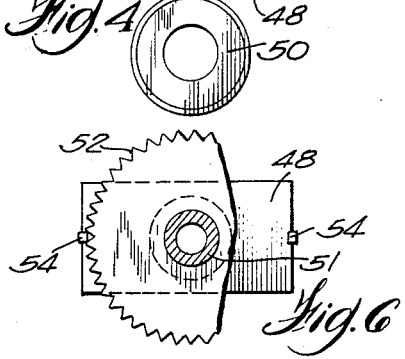
FIG. 6 is a meandering section taken on line 6—6 of FIG. 4.

Since the casing 202 is rectangular, like the casing of the embodiment of FIG. 2, the friction blocks 206 include friction pads which are rectangular and engage the flat inner surfaces of the opposite sides of the casing 202. Thus, there is provided means for preventing relative rotation between the friction blocks 206 and casing 202 about the axis of the rod 204.

Unlike the previous embodiments the embodiment of FIGS. 14 through 16 does not include a resilient clip defining a resilient means disposed between either of the wedge members and the inclined surfaces 212 and 214 of the friction blocks.

The friction blocks 206 each include a rigid metal backing plate 218 supporting pads 220 of friction material. The friction material is preferably of woven Teflon fibers. The inclined surfaces 212 and 214 at opposite ends of the friction blocks 206 are inclined in opposite directions so as to coact in a wedging fashion with the wedge members 208 and 210 respectively. The wedge members 208 and 210 are cylindrical with their axis disposed transversely of the rod 204, each of the cylindrical wedge members 208 and 210 having holes therethrough through which the rod extends with the hole in the cylindrical wedge member 208 being threaded to threadedly engage the rod 204.

There is also included attachment means comprising the well-known sockets 222 and 224 for attaching the casing 202 and the rod 204 to environmental structure such as an automobile and trailer. There is also included connection means generally indicated at 226 interconnecting the attachment means 224 and the rod 204 for allowing rotation thereof without rotating the attachment means 224 whereby the attachment means 222 and 224 may be attached to environmental structure and the rod 204 rotated to affect the adjustment of the frictional engagement between the friction blocks 206 and the casing 202. More specifically, the connection means comprises a tube 228 connected to the rod 204 through the flange 230, which may be welded to the rod, and includes a socket 232 at the other end rotatably connected to a stub shaft 234 of the attachment means 224. The tube 228 is freely rotatable relative to the stub shaft 234 and is nonrotatably connected to the shaft 204. There is also included a means defined by the passage 236 for receiving a tool to rotate the tube 228, the passage 236 extending diametrically through the tube 228. As best viewed in FIG. 16, the tube 228 is hollow and circular in cross section.

The second wedge member 210 abuts the flange 230 which is welded or formed as a part of the shaft 204.

FIG. 16 discloses an alternative embodiment of the connection means which is indicated with like numerals except for including a prime designation. The difference in the embodiment in FIG. 16 is that the tubular member 228' has a collar 240 welded into the end thereof to retain the cylindrical portion 234' in the end of the hollow tube 228'. The cylindrical portion 234' is of course rotatable within the tube 228'.

The present invention provides a friction type energy absorbing device which can replace the usual automotive hydraulic shock absorber and has the capability of being adjustable to give variation in the ride characteristics in the case of an automobile. It can also function as a door closure (or other device) with an adjustable rate. It is readily made double acting to enlarge the potential uses.

In all versions the frictional resistance to the motion can be made to increase as the applied force increases. In the double acting version the unit will resist motion of the rod and tube relative to each other in either direction. This force also can be adjusted to meet the operating conditions involved.

Shock absorbers made in accordance with this invention have been tested under identical conditions which led to total failure of a hydraulic shock absorber in 2,000 cycles. After 200,000 cycles a friction-type shock absorber using friction material of the type used in brake pads showed no appreciable signs of wear while a unit using the Teflon material showed no appreciable wear after 1,000,000 cycles. The Teflon-type units appear superior. The tests indicate, therefore, a life expectancy with either type material in excess of 100 times greater than that of a hydraulic shock absorber while being adjustable as well.

The embodiments of the invention in which an exclusive property or privilege is claimed are defined as follows:

1. An energy absorbing device comprising: a casing member, a rod member supported in said casing member for movement relative thereto, friction means disposed in frictional engagement with said casing member, and moving means for urging said friction means into said frictional engagement in response to said movement of said rod member relative to said casing member and for adjusting said frictional engagement in response to relative rotation between said moving means and said rod member; said moving means including wedge means for wedging said frictional means into frictional engagement with said casing member and actuation means disposed between said friction means and said wedge means, said actuation means including outwardly flaring portions defining an outwardly opening wedge surface adjacent said wedge means.

2. A device as set forth in claim 1 wherein said moving means is carried by said rod member and includes a threaded connection between said wedge means and said rod member.

3. An assembly as set forth in claim 2 including attachment means for attaching said casing member and said rod member to environmental structure and including connection means interconnecting said attachment means and one of said casing member and said rod member for allowing rotation thereof without rotating said attachment means whereby said attachment means may be attached to environmental structure and one of said casing member and rod member rotated to effect the adjustment of said frictional engagement.

4. A device as set forth in claim 2 wherein said rod member includes first and second portions, said first portion being rotatable independently of said second portion and carrying said moving means whereby said first portion may be rotated relative to said casing member and said second portion; said second portion comprising attachment means for attaching said rod member to an environmental structure.

5. A device as set forth in claim 4 wherein said first portion includes a tubular member and said second portion includes a cylindrical member rotatably received within said tubular member.

6. A device as set forth in claim 5 including means for preventing relative rotation between said friction means and said casing member about the axis of said rod member thereby effecting relative rotation between said moving means and said rod member.

7. A device as set forth in claim 6 wherein said casing member is hollow and four-sided in cross section to define said means for preventing said rotation between said friction means and said casing member.

8. A device as set forth in claim 6 wherein said friction means includes a pair of friction blocks disposed in opposed relationship to one another so as to engage opposite sides of said casing member.

9. A device as set forth in claim 8 wherein said wedge means includes wedge blocks disposed at each end of said friction blocks.

10. A device as set forth in claim 9 wherein said wedge blocks are wedge cylinders disposed on said rod member, one of said wedge cylinders being threadedly attached to said rod member.

11. A device as set forth in claim 9 wherein said actuation means includes a supportive backing plate for supporting each of said friction blocks, said outwardly flaring portions being disposed on the ends of said backing plate.

12. A device as set forth in claim 11 wherein said second portion of said rod member includes a socket at the end opposite said cylindrical member defining said attachment means.

13. A device as set forth in claim 12 wherein said first portion includes means for receiving a tool to rotate the same relative to said second portion and said casing member.

14. A device as set forth in claim 13 wherein each of said friction blocks includes a pad having friction surfaces engaging said casing member made of woven Teflon fibers bonded to a rigid backing material.

15. A device as set forth in claim 2 wherein said casing member includes first and second portions, said first portion being rotatable independently of said second portion, said first portion including means for preventing relative rotation between said friction means and said casing member thereby effecting relative rotation between said moving means and said rod member; said second portion defining attachment means for attaching said casing member to an environmental structure.

16. A device as set forth in claim 15 wherein said casing member is substantially circular in cross section and includes an inwardly extending axial groove defining said means for preventing relative rotation between said friction means and said casing member.

* * * * *